US008665299B2

(12) United States Patent
Miyadera et al.

(10) Patent No.: US 8,665,299 B2
(45) Date of Patent: Mar. 4, 2014

(54) EXPOSURE CONTROL APPARATUS, IMAGE FORMING APPARATUS, AND EXPOSURE CONTROL METHOD

(75) Inventors: Tatsuya Miyadera, Osaka (JP); Yoshinori Shirasaki, Osaka (JP); Motoyoshi Takahashi, Osaka (JP); Masayuki Hayashi, Osaka (JP); Kunihiro Komai, Osaka (JP); Fuminori Tsuchiya, Osaka (JP); Akinori Yamaguchi, Osaka (JP); Hiroaki Ikeda, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/617,458

(22) Filed: Sep. 14, 2012

(65) Prior Publication Data

US 2013/0070040 A1 Mar. 21, 2013

(30) Foreign Application Priority Data

Sep. 16, 2011 (JP) .................................. 2011-203844

(51) Int. Cl.
*B41J 2/385* (2006.01)
*B41J 2/45* (2006.01)

(52) U.S. Cl.
USPC ......................................... 347/130; 347/238

(58) Field of Classification Search
None
See application file for complete search history.

(56) References Cited

U.S. PATENT DOCUMENTS

| 2004/0160508 A1* | 8/2004 | Ono ............................... 347/237 |
| 2005/0128538 A1 | 6/2005 | Mitani |
| 2012/0062681 A1 | 3/2012 | Miyadera et al. |

FOREIGN PATENT DOCUMENTS

| JP | 11-010940 | 1/1999 |
| JP | 2005-170033 | 6/2005 |
| JP | 2007-022041 | 2/2007 |
| JP | 2012-061675 | 3/2012 |

* cited by examiner

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

An exposure control apparatus includes: a plurality of line memories; a processing unit that processes image data by successively recording the image data to the plurality of line memories, and successively reading the image data from the plurality of line memories; and an exposing unit that performs, with an exposure cycle, an exposure process according to the processed image data, and that forms a latent image based on the image data onto an image carrier, wherein the image data is transferred with a cycle which is N times as high as the exposure cycle (N is a natural number), and the processing unit reads the image data N times with the exposure cycle.

16 Claims, 7 Drawing Sheets

EXPOSURE CONTROL APPARATUS, IMAGE FORMING APPARATUS, AND EXPOSURE CONTROL METHOD

CROSS-REFERENCE TO RELATED APPLICATIONS

The present application claims priority to and incorporates by reference the entire contents of Japanese Patent Application No. 2011-203844 filed in Japan on Sep. 16, 2011.

BACKGROUND OF THE INVENTION

1. Field of the Invention

The present invention relates to an exposure control apparatus, an image forming apparatus, and an exposure control method.

2. Description of the Related Art

In an electrophotographic image forming apparatus performing exposure process using an LEDA (light-emitting diode array), a line interval in a sub-scanning direction is determined by relationship between a generation cycle of an HSYNC signal representing exposure (write) start timing for one line and a conveying speed of paper. If the above relationship is mismatched, the image expands or shrinks in the sub-scanning direction, which results in uneven density and positional deviation. Accordingly, for example, Japanese Patent Application Laid-open No. 11-010940 discloses a technique for adjusting a generation cycle of an HSYNC signal with respect to a conveying speed of paper.

However, when the generation cycle of the HSYNC signal is changed according to the above conventional technique, the light-emitting time per line changes, which changes the light-emitting time per pixel, and the line cycle changes, which changes the pixel interval in the sub-scanning direction, whereby this affects the image quality.

Therefore, there is a need to provide an exposure control apparatus, an image forming apparatus, and an exposure control method capable of reducing the adverse influence on the image quality and achieving high quality printing.

SUMMARY OF THE INVENTION

It is an object of the present invention to at least partially solve the problems in the conventional technology.

According to an aspect of the present invention, there is provided an exposure control apparatus including: a plurality of line memories; a processing unit that processes image data by successively recording the image data to the plurality of line memories, and successively reading the image data from the plurality of line memories; and an exposing unit that performs, with an exposure cycle, an exposure process according to the processed image data, and that forms a latent image based on the image data onto an image carrier, wherein the image data is transferred with a cycle which is N times as high as the exposure cycle (N is a natural number), and the processing unit reads the image data N times with the exposure cycle.

According to another aspect of the present invention, there is provided an image forming apparatus including an exposure control apparatus, the exposure control apparatus including: a plurality of line memories; a processing unit that processes image data by successively recording image the data to the plurality of line memories, and successively reading the image data from the plurality of line memories; and an exposing unit that performs, with an exposure cycle, an exposure process according to the processed image data, and that forms a latent image based on the image data onto an image carrier, wherein the image data is transferred with a cycle which is N times as high as the exposure cycle (N is a natural number), and the processing unit reads the image data N times with the exposure cycle.

According to still another aspect of the present invention, there is provided an exposure control method including: processing, by a processing unit, image data by successively recording the image data to a plurality of line memories and by successively reading the image data from the plurality of line memories; performing, by an exposing unit, an exposure process according to the processed image data, with an exposure cycle, and forming, by the exposing unit, a latent image based on the image data onto an image carrier, wherein the image data is transferred with a cycle which is N times as high as the exposure cycle (N is a natural number), and at the processing, the image data is read N times with the exposure cycle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an exposure control apparatus, an image forming apparatus, and an exposure control method according to the present invention will be described in detail with reference to the appended drawings. In the following embodiment, an image forming apparatus having the exposure control apparatus of the present invention will be explained using an example where the present invention is applied to an electrophotographic printing apparatus, but the present invention is not limited thereto. The image forming apparatus of the present invention can be applied as long as it is an apparatus for forming an image according to electrophotographic method. For example, the present invention can also be applied to an electrophotographic copying machine, a multifunction peripheral (MFP), and the like. The multifunction peripheral is an apparatus having at least two functions of a print function, a copy function, a scanner function, and a facsimile function.

Figure 1:
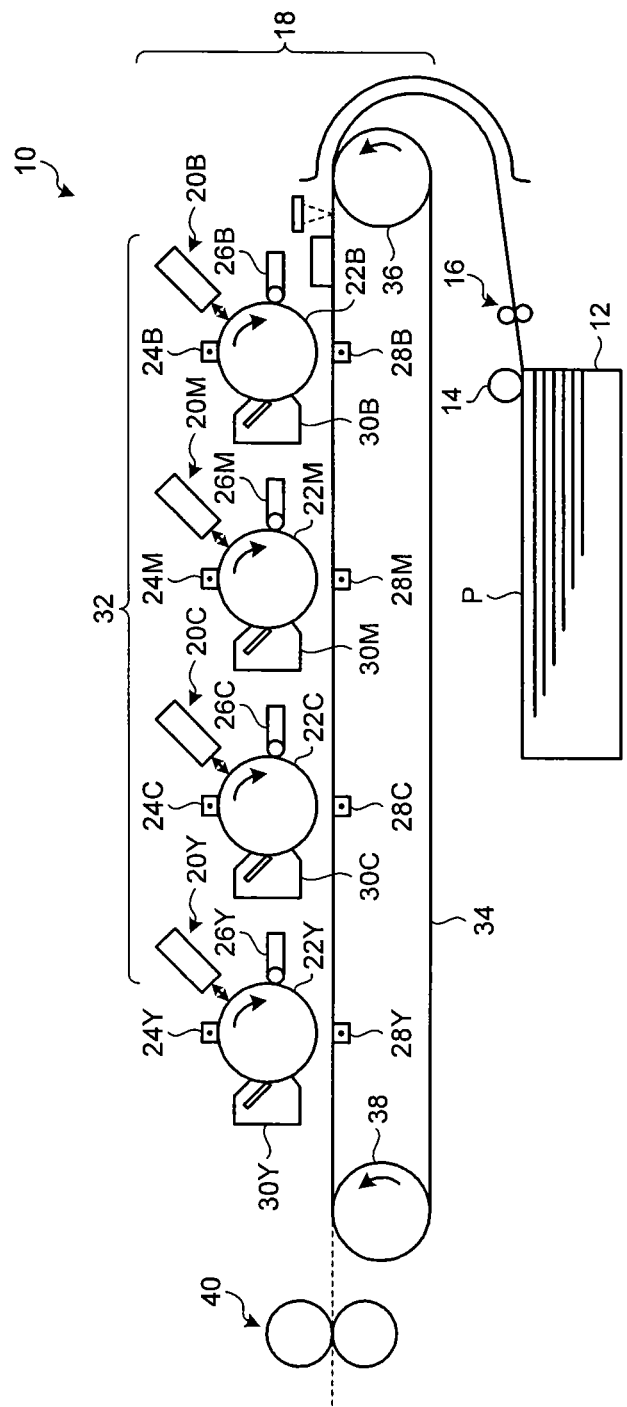
FIG. 1 is a schematic configuration illustrating an example of a mechanical configuration of a printing apparatus according to the present embodiment.

FIG. 1 is a schematic configuration illustrating an example of a mechanical configuration of a printing apparatus 10 according to the present embodiment.

As shown in FIG. 1, the printing apparatus 10 includes a paper feed tray 12, a paper feeding roller 14, a separation roller pair 16, an image forming unit 18, a fixing unit 40. The example as illustrated in FIG. 1 shows a so-called tandem type printing apparatus in which image making units of respective colors are arranged along a conveying belt as explained later. However, the present invention is not limited thereto.

In the paper feed tray 12, multiple recording sheets are accommodated in an overlapping manner.

The paper feeding roller 14 is in contact with recording sheet P located at the uppermost portion of the paper feed tray 12, and feeds the recording sheet P which is in contact with the paper feeding roller 14.

The separation roller pair 16 feeds the recording sheet P, which has been fed by the paper feeding roller 14, to the image forming unit 18. When two or more recording sheets are fed by the paper feeding roller 14, the separation roller pair 16 pushes back recording sheets other than the recording sheet P, thereby separating the recording sheet P and the recording sheets other than the recording sheet P and conveying only the recording sheet P to the image forming unit 18.

The image forming unit 18 forms an image on the recording sheet P conveyed by the separation roller pair 16, and includes image making units 20B, 20M, 20C, and 20Y, an LEDA head 32, a conveying belt 34, a driving roller 36, and a driven roller 38.

The image making units 20B, 20M, 20C, and 20Y are arranged along the conveying belt 34 in the order corresponding to the image making units 20B, 20M, 20C, and 20Y from the upstream side of the conveying direction of the conveying belt 34 conveying the recording sheet P conveyed from the separation roller pair 16.

The image making unit 20B includes a photosensitive drum 22B, and also includes a charger 24B, a developing unit 26B, a transfer unit 28B, a photosensitive cleaner (not shown), and a neutralization device 30B, which are arranged around the photosensitive drum 22B. The image making unit 20B and the LEDA head 32 performs image making process (charging step, exposing step, developing step, transfer step, cleaning step, and electrostatic eliminating step) on the photosensitive drum 22B, whereby a black toner image is formed on the photosensitive drum 22B.

It should be noted that any one of the image making units 20M, 20C, and 20Y has the same constituent elements as those of the image making unit 20B. The image making unit 20M performs image making process to form magenta toner image. The image making unit 20C performs image making process to form cyan toner image. The image making unit 20Y performs image making process to form yellow toner image. Therefore, in the explanation below, the constituent elements of the image making unit 20B will be mainly explained. The constituent elements of the image making units 20M, 20C, and 20Y are attached with M, C, Y, respectively, instead of B that is attached to the reference numerals of the constituent elements of the image making unit 20B, and description thereabout is omitted.

The photosensitive drum 22B (an example of image carrier) is driven and rotated by a driving motor, not shown.

First, in the charging step, the charger 24B uniformly charges, in the darkness, the external peripheral surface of the photosensitive drum 22B that is driven and rotated.

Subsequently, in the exposing step, the LEDA head 32 (example of exposing unit) uses illuminating light corresponding to a black image to expose the external peripheral surface of the photosensitive drum 22B that is driven and rotated, whereby an electrostatic latent image corresponding to the black image is formed on the photosensitive drum 22B. In the case of the photosensitive drum 22M, the LEDA head 32 uses illuminating light corresponding to a magenta image to expose the external peripheral surface. In the case of the photosensitive drum 22C, the LEDA head 32 uses illuminating light corresponding to a cyan image to expose the external peripheral surface. In the case of the photosensitive drum 22Y, the LEDA head 32 uses illuminating light corresponding to a yellow image to expose the external peripheral surface.

Subsequently, in the developing step, the developing unit 26B develops the electrostatic latent image formed on the photosensitive drum 22B using black toner, and forms a black toner image on the photosensitive drum 22B.

Subsequently, in the transfer step, at a transfer position where the photosensitive drum 22B comes into contact with the recording sheet P conveyed by the conveying belt 34, a transfer unit 28B transfers the black toner image formed on the photosensitive drum 22B to the recording sheet P. A very little amount of non-transferred toner remains on the photosensitive drum 22B after the toner image has been transferred.

Subsequently, in the cleaning step, the photosensitive cleaner cleans the non-transferred toner remaining on the photosensitive drum 22B.

Finally, in the electrostatic eliminating step, the neutralization device 30B eliminates residual potential on the photosensitive drum 22B. Then, the image making unit 20B stands by for subsequent image forming process.

The conveying belt 34 is an endless belt wrapped around the driving roller 36 and the driven roller 38. The recording sheet P conveyed from the separation roller pair 16 is attracted to the conveying belt 34 with electrostatic attraction effect. The conveying belt 34 endlessly moves when the driving roller 36 is driven and rotated by a driving motor, not shown, whereby the recording sheet P attracted thereto is conveyed to the image making units 20B, 20M, 20C, 20Y, in this order.

Then, first, the image making unit 20B transfers the black toner image onto the recording sheet P conveyed by the conveying belt 34. Subsequently, the image making unit 20M transfers the magenta toner image onto the recording sheet P conveyed by the conveying belt 34, the image making unit 20C transfers the cyan toner image onto the recording sheet P conveyed by the conveying belt 34, and the image making unit 20Y transfers the yellow toner image onto the recording sheet P conveyed by the conveying belt 34, in an overlapping manner. Accordingly, a full-color image is formed on the recording sheet P.

The fixing unit 40 heats and pressurizes the recording sheet P separated from the conveying belt 34, so that the full color image formed by the image making units 20B, 20M, 20C, and 20Y is fixed to the recording sheet P. The recording sheet P having the image fixed thereon is discharged out of the printing apparatus 10.

Figure 2:
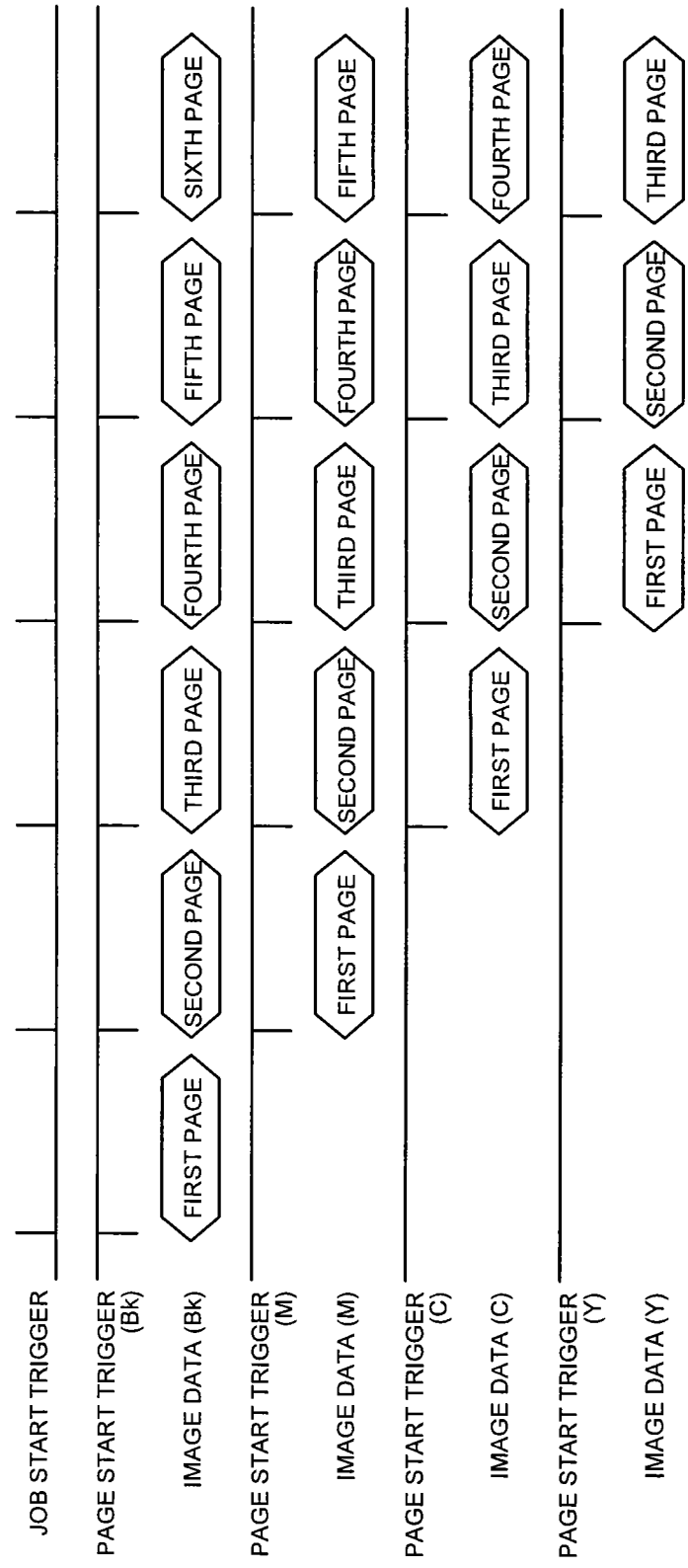
FIG. 2 is an explanatory diagram illustrating an example of successive printing performed by the printing apparatus according to the present embodiment.

FIG. 2 is an explanatory diagram illustrating an example of successive printing by the printing apparatus 10 according to the present embodiment. As illustrated in FIG. 2, the job start trigger is a start signal commanding start printing for each page. The page start trigger is prepared for black (Bk), magenta (M), cyan (C), and yellow (Y), respectively and is a start signal commanding start printing for the corresponding color.

For example, by a job start trigger, the printing apparatus 10 is commanded to start printing of the first page. When the printing apparatus 10 is commanded to print black color by a page start trigger (Bk), the printing apparatus 10 causes the image making unit 20B and the LEDA head 32 to start forming an image based on the black color image data for the first page.

In the present embodiment, in order to improve the productivity of printing operation, as shown in FIG. 2, the job start trigger commands forming of an image based on image data for a subsequent page, when the image making unit (in the present embodiment, the image making unit 20B) that initially starts image forming process finishes forming of the image based on the image data of the page commanded by the job start trigger.

For this reason, in the present embodiment, pages of image data of which images are formed may be different in an image making unit located upstream and an image making unit located downstream. In particular, when printing operation of a small size such as a postcard and a business card is performed, up to four pages of printing operations can be stocked between the image making unit 20B and the image making unit 20Y as shown in FIG. 2. Therefore, each image making unit is forming an image based on image data for a different page.

In this case, when the resolution in the sub-scanning direction of an image formed by each image making unit is different (when the resolution in the sub-scanning direction of an image is different in each page), and the printing apparatus 10 copes with this issue by changing, for each color, the HSYNC cycle which is the line cycle (exposure cycle) of the LEDA head 32, the maximum light-emitting time of one dot determined by the HSYNC cycle and the adjacent dot interval in the sub-scanning direction are changed, whereby the image concentration changes, which may affect the image quality.

Therefore, in the present embodiment, the printing apparatus 10 copes with this issue as follows. Even when the resolution in the sub-scanning direction of the image formed by each image making unit is different, double-density processing is performed for each color, instead of changing the HSYNC cycle of the LEDA head 32 for each color.

Figure 3:
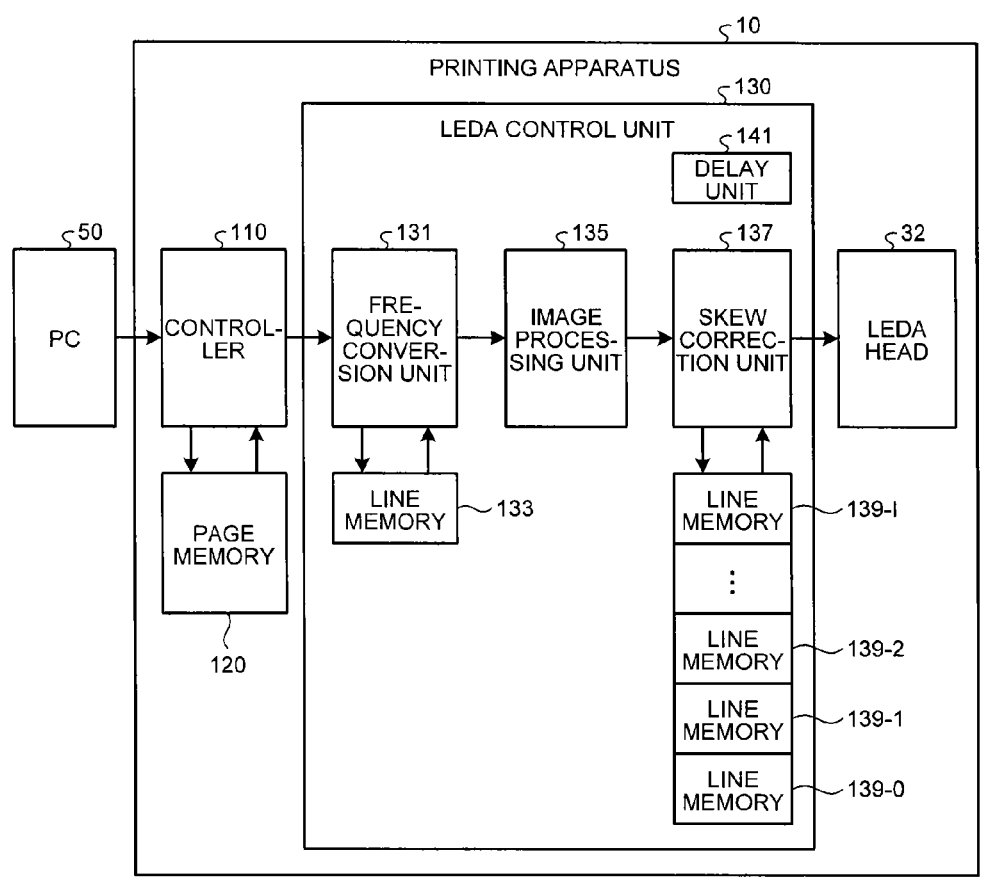
FIG. 3 is a block diagram illustrating an example of a functional configuration of the printing apparatus according to the present embodiment.

FIG. 3 is a block diagram illustrating an example of a functional configuration of the printing apparatus 10 according to the present embodiment. As shown in FIG. 3, the printing apparatus 10 includes a controller 110, a page memory 120, an LEDA control unit 130, and an LEDA head 32. It should be noted that the LEDA control unit 130 and the LEDA head 32 are an example of exposure control apparatus.

The controller 110 receives print data generated by a PC 50 (printer driver installed to the PC 50 via a network (not shown)). It should be noted that the print data is described in, for example, PDL (Page Description Language). Then, the controller 110 converts the received print data into image data (for example, bit map data) constituted by multiple pixels on the page memory 120, and transfers the image data to the LEDA control unit 130 in units of lines.

The LEDA control unit 130 causes the LEDA head 32 to emit light on the basis of the image data transferred from the controller 110 in units of lines, thereby forming an electrostatic latent image. More specifically, the LEDA control unit 130 treats the image data, which are transferred from the controller 110, as light-emitting data. The LEDA control unit 130 includes a frequency conversion unit 131, a line memory 133, an image processing unit 135, a skew correction unit 137, line memories 139-0 to 139-I (I is a natural number of 2 or more), and a delay unit 141.

It should be noted that the LEDA control unit 130 includes multiple channels (not shown), i.e., channel 0 (ch0) to channel 3 (ch3). The image data transferred from the controller 110 in units of lines are input to the channels corresponding to respective colors, and are transferred to the frequency conversion unit 131, the image processing unit 135, and the skew correction unit 137, in this order. Accordingly, the frequency conversion unit 131, the image processing unit 135, and the skew correction unit 137 performs the following processing on the image data of each color transferred from ch0 to ch3 in units of lines.

In the present embodiment, black image data is input into ch0, magenta image data is input into ch1, cyan image data is input into ch2, and yellow image data is input into ch3. However, the present embodiment is not limited thereto. The image data transferred from ch0 to ch3 is transferred with a cycle which is N times as high as the HSYNC cycle (N is a natural number). It should be noted that the value of N may be different for each channel.

The controller 110 and the LEDA control unit 130 have different operation clock frequencies. For this reason, the frequency conversion unit 131 successively records, to the line memory 133, the image data transferred from the controller 110 in units of lines, and successively reads the recorded image data on the basis of the operation clock of the LEDA control unit 130, thus performing the frequency conversion and transferring the image data to the image processing unit 135 in units of lines.

The image processing unit 135 performs image processing on image data transferred from the frequency conversion unit 131 in units of lines, and transfers the image data to the skew correction unit 137 in units of lines. The image processing is, for example, processing for attaching an internal pattern and trimming processing. When processing requiring a line memory such as jaggy correction is performed as the image processing, the LEDA control unit 130 has a line memory for the image processing unit 135.

The skew correction unit 137 (an example of processing unit) successively records image data, which is transferred from the image processing unit 135 in units of lines, to the line memories 139-0 to 139-I (an example of a plurality of line memories), and successively reads a reading-target line memory of the line memories 139-0 to 139-I while switching in accordance with the image position, thus performing skew correction, and transfers the image data to the LEDA head 32 in units of lines. In the present embodiment, the skew correction unit 137 performs the skew correction to correct the swell characteristics of the LEDA head 32. However, the skew correction is not limited thereto. Alternatively, the skew correction may be configured to correct the inclination of the image on the basis of the image data.

Then, when the skew correction unit 137 reads image data from the line memories 139-0 to 139-I, the skew correction unit 137 continuously reads the same image data from the line memory N times, thus performing double-density processing. As a result of the double-density processing, the image data is made into high-density image data of which resolution in the sub-scanning direction is N times higher. It should be noted that the skew correction unit 137 reads the image data with the HSYNC cycle.

As a result, when the transfer cycle of the image data from the channel is, for example, a cycle twice as high as the HSYNC cycle, the skew correction unit 137 reads the image data twice during the transfer cycle of the image data (while the image data is written once). When the transfer cycle of the image data from the channel is, for example, a cycle four times as high as the HSYNC cycle, the skew correction unit 137 reads the image data four times during the transfer cycle of the image data (while the image data is written once).

Figure 4:
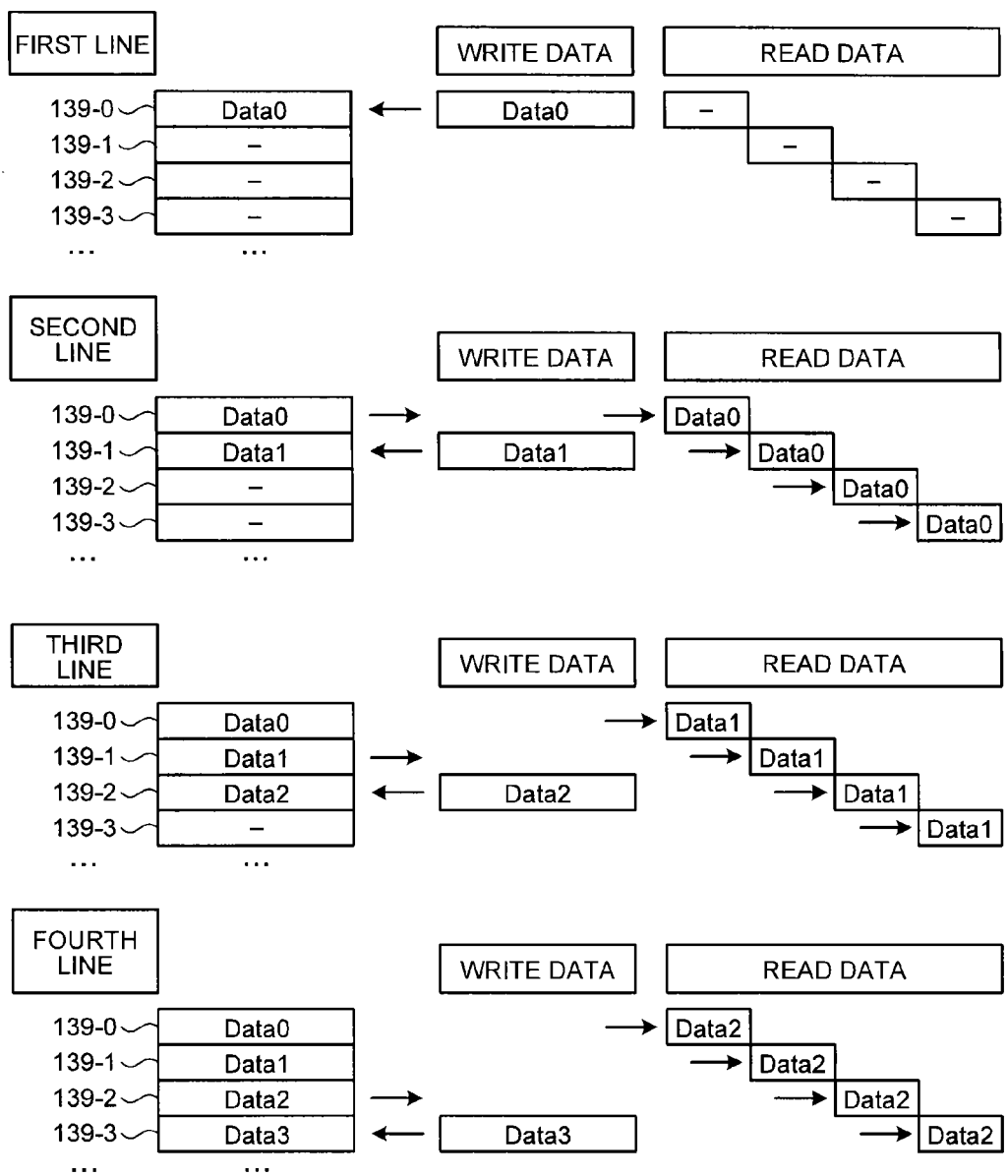
FIG. 4 is an explanatory diagram illustrating an example of double-density processing.

FIG. 4 is an explanatory diagram illustrating an example of double-density processing. In the example as shown in FIG. 4, N is four, and while image data is recorded once to a line memory of the line memories 139-0 to 139-I, the same image data is continuously read four times from another line memory.

In the example as shown in FIG. 4, first, image data (Data0) of the first line which is the data at the head of a page is recorded to the line memory 139-0 as write-data. It is impossible to record write-data and read read-data to the same line memory at the same time. Therefore, at this time, the image data (Data0) of the first line is not read from the line memory 139-0. The image data (Data0) of the first line is read at a subsequent time.

Subsequently, image data (Data1) of the second line is recorded to the line memory 139-1 as write-data, and the image data (Data0) of the first line is continuously read four times from the line memory 139-0 as read-data. With this double-density processing, the image data (Data0) of the first line is made into image data of which resolution in the sub-scanning direction is four times, so that a higher density is attained.

Subsequently, image data (Data2) of the third line is recorded to the line memory 139-2 as write-data, and the image data (Data1) of the second line is continuously read four times from the line memory 139-1 as read-data. With this double-density processing, the image data (Data1) of the second line is made into image data of which resolution in the sub-scanning direction is four times, so that a higher density is attained.

Thereafter, the double-density processing is performed on image data of each line, so that a higher density is attained.

However, when the skew correction unit 137 performs the double-density processing at the same time as the skew correction like the present embodiment, the skew correction unit 137 reads image data of each line with timing in accordance with the amount of skew correction. Therefore, when the image data (Data1) of the second line is recorded, the skew correction unit 137 may not read the image data (Data0) of the first line. At a time subsequent thereto, the skew correction unit 137 may read the image data (Data0) of the first line.

The skew correction unit 137 divides one line into multiple (for example, leading end of line, center of line, trailing end of line), and the image data is read with different timing in accordance with an area of the divided line. For example, at the leading end of the line, the skew correction unit 137 may read the image data (Data0) of the first line while the image data (Data2) of the third line is recorded. At the center of the line, the skew correction unit 137 may read the image data (Data0) of the first line while the image data (Data1) of the second line is recorded. At the trailing end of the line, the skew correction unit 137 may read the image data (Data0) of the first line while the image data (Data3) of the fourth line is recorded. Therefore, the image based on the image data can be intentionally inclined, so that, for example, the swell characteristics of the LEDA head 32 can be corrected.

When the skew correction unit 137 selects a line memory, from which image data is read, in units of lines after the double-density processing, the amount of correction (shift) for one time during the skew correction can be reduced, so that adverse effects caused by the skew correction processing can be reduced.

Back to FIG. 3, the delay unit 141 delays the phase of the HSYNC cycle in units of clocks. The delay unit 141 can delay the phase of the HSYNC cycle for each channel.

Depending on the type of the LEDA head 32, the arrangement of data need to be converted in accordance with wiring of the LEDA head 32. Therefore, when the arrangement conversion is applied to all the lines, the LEDA control unit 130 has a line memory for arrangement conversion. Then, the image data on which the skew correction has been performed is subjected to arrangement conversion process on this line memory, and are transferred to the LEDA head 32 in units of lines.

The LEDA head 32 exposes, with the HSYNC cycle, the image data for one line transferred from the skew correction unit 137 with the HSYNC cycle, and thus forming an electrostatic latent image. In the present embodiment, the skew correction unit 137 performs the double-density processing, and therefore, the LEDA head 32 can form the electrostatic latent image while the resolution is increased in the sub-scanning direction of the image data, and precise grey level control and positioning control can be done.

Figure 5:
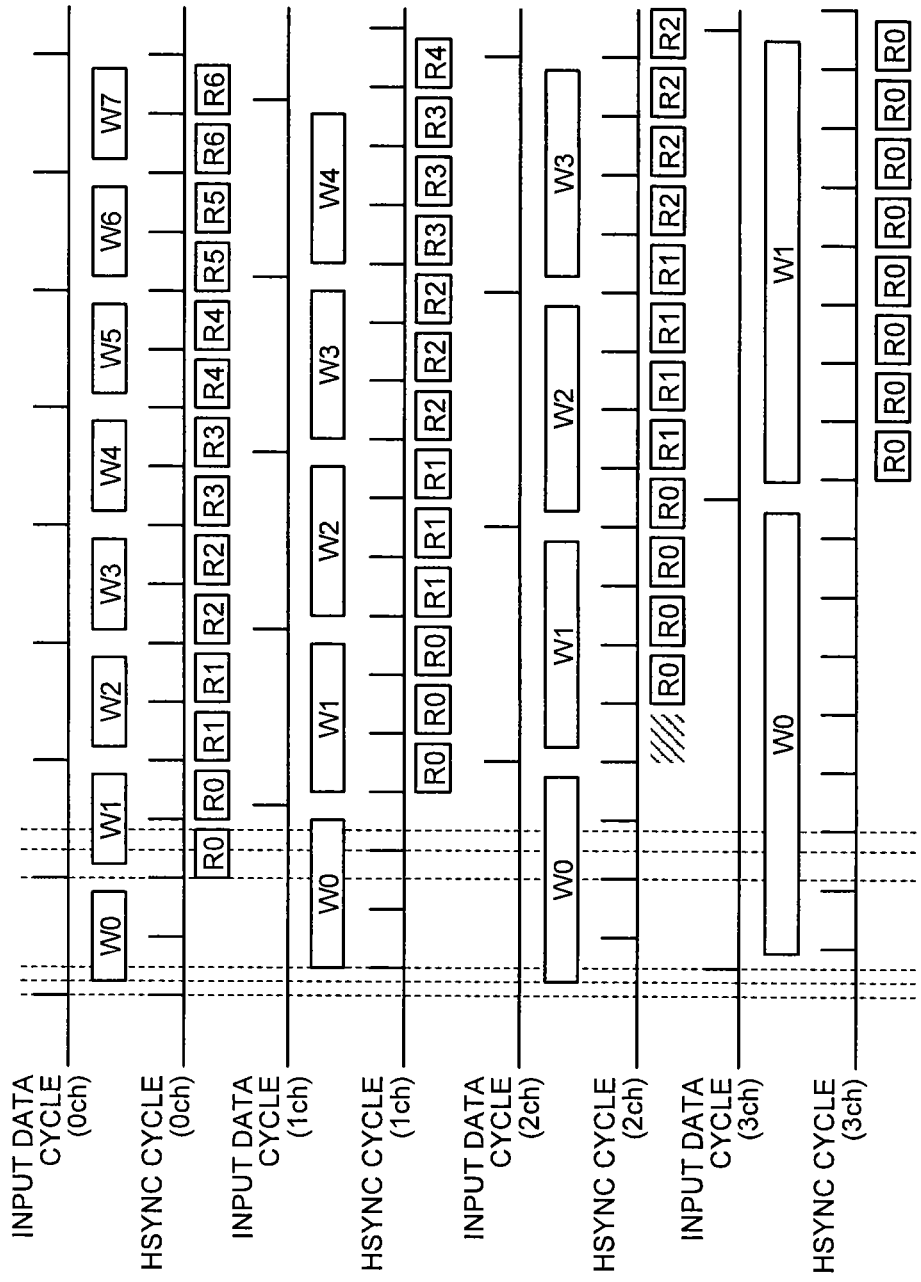
FIG. 5 is an explanatory diagram illustrating an example of relationship between an HSYNC cycle and a transfer cycle (input data cycle) of image data according to the present embodiment.

FIG. 5 is an explanatory diagram illustrating an example of relationship between the HSYNC cycle and the transfer cycle (input data cycle) of image data according to the present embodiment. In the example as shown in FIG. 5, pages of image data in black, magenta, cyan, and yellow are all different, and the resolution of image data is different in each page.

In the example as shown in FIG. 5, the transfer cycle (input data cycle) of black image data transferred from ch0 is twice as high as the HSYNC cycle. The transfer cycle (input data cycle) of magenta image data transferred from ch1 is three times as high as the HSYNC cycle. The transfer cycle (input data cycle) of cyan image data transferred from ch2 is four times as high as the HSYNC cycle. The transfer cycle (input data cycle) of yellow image data transferred from ch3 is eight times as high as the HSYNC cycle.

Therefore, in ch0, the HSYNC cycle is of a density twice as high as the transfer cycle. In ch1, the HSYNC cycle is of a density three times as high as the transfer cycle. In ch2, the HSYNC cycle is of a density four times as high as the transfer cycle. In ch3, the HSYNC cycle is of a density eight times as high as the transfer cycle. In any channel, however, the HSYNC cycle is the same.

As a result, the skew correction unit 137 reads, twice, the black image data transferred from ch0 during the transfer cycle of ch0 (while the image data is written once). In FIG. 5, W0 to W7 represent write-data, and R0 to R6 represent read-data. Likewise, the skew correction unit 137 reads, three times, the magenta image data transferred from ch1 during the transfer cycle of ch1 (while the image data is written once). The skew correction unit 137 reads, four times, the cyan image data transferred from ch2 during the transfer cycle of ch2 (while the image data is written once). The skew correction unit 137 reads, eight times, the yellow image data transferred from ch3 during the transfer cycle of ch3 (while the image data is written once).

As described, in the present embodiment, even when the resolutions of the image data in black, magenta, cyan, and yellow are different from each other, the double-density processing is performed in accordance with the transfer cycle of the image data, thus obtaining the same HSYNC cycle in any channel. Therefore, according to the present embodiment, the exposure characteristics of the LEDA head 32 become constant, and the maximum light-emitting time of one dot determined by the HSYNC cycle and the adjacent dot interval in the sub-scanning direction can be fixed. This prevents change of the image density, alleviates the effect on the image quality, and achieves high quality printing.

It should be noted that, in the example as shown in FIG. 5, the delay unit 141 causes the phase of the HSYNC cycle each of ch0 and ch2 to be the same, but causes the phase of the HSYNC cycle of ch1 to be delayed by two clocks with respect to the HSYNC cycle of ch0 and ch2, and causes the phase of the HSYNC cycle of ch3 to be delayed by one clock with respect to the HSYNC cycle of ch0 and ch2.

Accordingly, the skew correction unit 137 reads the image data in magenta and yellow with a delayed HSYNC cycle, and the LEDA head 32 exposes the image data with the delayed HSYNC cycle. Therefore, according to the present embodiment, the image position in the sub-scanning direction can be adjusted, and the positional deviation in the sub-scanning direction can be corrected with a high degree of accuracy.

It should be noted that the amount of delay that the delay unit 141 can delay the phase of the HSYNC cycle is equal to or less than the HSYNC cycle. The delay unit 141 uses a counter different from counters for ch0 to ch3 or any one of counters for ch0 to ch3 to delay the HSYNC cycle by the amount of delay. In this case, in the present embodiment, the counters for ch0 to ch3 are counters operating on the basis of the HSYNC cycles of ch0 to ch3, respectively. The counter different from the counters for ch0 to ch3 is a master counter operating with the main scanning synchronization signal. However, they are not limited thereto.

In the example as shown in FIG. 5, in ch2, the skew correction unit 137 delays the HSYNC cycle by one cycle and reads the cyan image data, and the LEDA head 32 delays the HSYNC cycle by one cycle and carries out exposure. Even with such operation, the image position in the sub-scanning direction can be adjusted, and the positional deviation in the sub-scanning direction can be corrected with a high degree of accuracy. In this method, the amount of delay of the phase of the HSYNC cycle is a multiple integer of the HSYNC cycle.

The line memory used in the present embodiment may be any one of an SRAM (Static Random Access Memory), a flip-flop, and a nonvolatile RAM (NVRAM).

The line memory used in the present embodiment may perform operation upon switching any one of write and read operations in accordance with write enable, may perform operation upon switching a write clock and a read clock, may carry out write and read at the same time, and the line memory may operate with two kinds of clocks for write and read.

Depending on the IF specification with the controller 110, the LEDA control unit 130 also make a phase difference between channels for the transfer cycle (input data cycle), but this phase difference is absorbed when the image data is recorded to the line memories 139-0 to 139-I, and therefore, this does not cause any effect.

In the present embodiment, even if the value of N changes, the strobe signal generation cycle and the strobe time of the LEDA head 32 are constant.

Modification

The present invention is not limited to the above embodiment, and various modifications are possible.

Modification 1

In the above embodiment, when the value of N is changed, the LEDA control unit 130 may not reflect the change of the value of N until printing is completed or image data in a page being exposed has been exposed. In this case, the operation of the LEDA control unit 130 can be stabilized.

Modification 2

In the above embodiment, when the transfer of the image data is interrupted, the LEDA head 32 may expose image data for one line and then interrupts the exposure process. In this case, the operation of the LEDA control unit 130 can be stabilized.

Modification 3

In the above embodiment, the line memory used for the double-density processing is adopted as a line memory for skew correction. However, the line memory used for the double-density processing is not limited thereto.

For example, the line memory used for the double-density processing may be the line memory 133 that the frequency conversion unit 131 uses for the frequency conversion, or may be the line memory that the image processing unit 135 uses for the image processing. In this case, the image processing corresponds to for example, processing for correcting the characteristics of the image data, processing for correcting jaggy, or dithering processing.

For example, the line memory used in the double-density processing may be a line memory used by a frequency conversion unit (not shown) for converting the transfer frequency of image data from the operation frequency of the LEDA control unit 130 to the operation frequency of the LEDA head 32. Alternatively, the line memory used in the double-density processing may be a line memory used by an arrangement conversion unit (not shown) converting data arrangement in accordance with the LEDA head 32, or may be a line memory used by a cycle variation correction unit (not shown) correcting variation of the cycle in the sub-scanning direction.

For example, when the LEDA control unit 130 has a counting unit (not shown) for counting the amount of consumed toner of a pixel in question in view of the amount of light of pixels therearound, the line memory may be a line memory for counting the amount of consumed toner. The line memory for counting the amount of consumed toner may be a line memory shared with the line memory for the skew correction.

Modification 4

In the explanation about the above embodiment, for example, the exposure mechanism is achieved using the LEDA head 32. Alternatively, the exposure mechanism may be achieved using a binary device operating in either completely ON state or in completely OFF state, a multi-beam LD (laser diode), surface light-emitting LD, or an organic EL head.

Modification 5

In the explanation about the above embodiment, for example, each image making unit directly forms an image onto a recording sheet. Alternatively, each image making unit may form an image on an intermediate transfer belt, and the image may be transferred from the intermediate transfer belt onto a recording sheet. In the explanation below, difference from the above embodiment will be mainly explained, and constituent elements having the same functions as those of the above embodiment will denoted with the same names and reference numerals as those of the above embodiment, and explanation thereabout is omitted.

Figure 6:
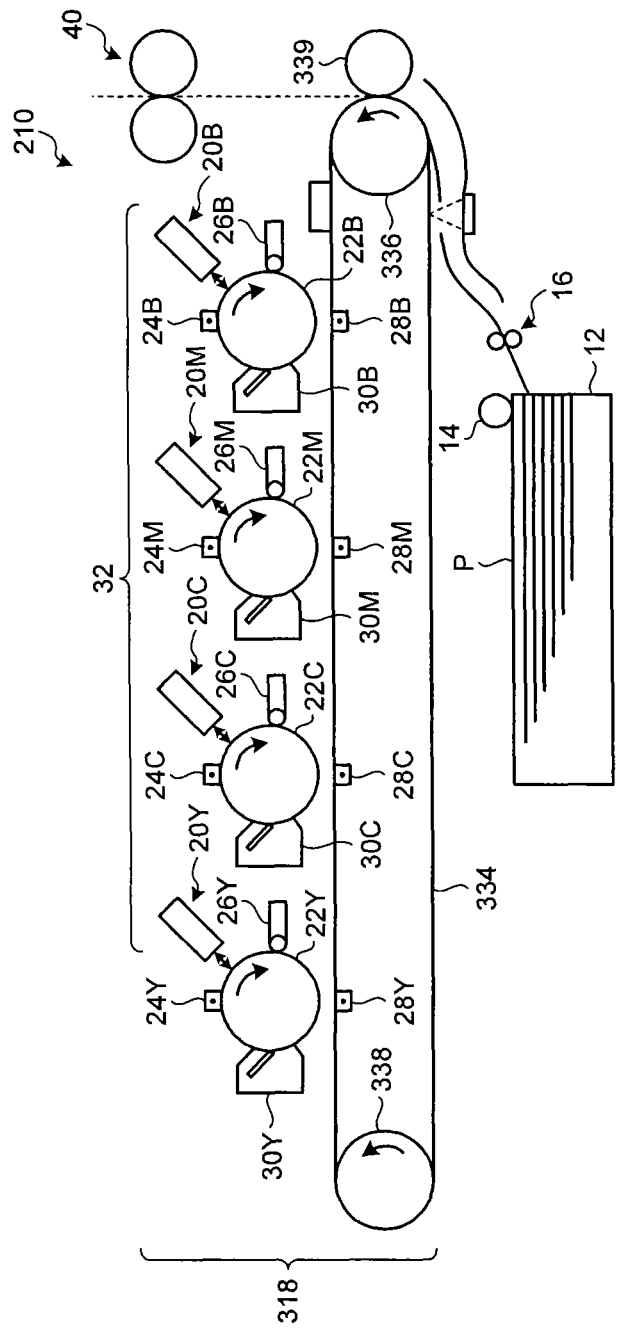
FIG. 6 is a schematic configuration illustrating an example of a mechanical configuration of a printing apparatus according to a fifth modification.

FIG. 6 is a schematic configuration illustrating an example of a mechanical configuration of a printing apparatus 210 according to the fifth modification. As shown in FIG. 5, in the printing apparatus 210, an image forming unit 318 includes an intermediate transfer belt 334, a driving roller 336, and a driven roller 338 in place of the conveying belt 34, the driving roller 36, and the driven roller 38, and is different from the first embodiment in that a secondary transfer roller 339 is additionally provided.

The intermediate transfer belt 334 is an endless belt wrapped around the driving roller 336 and the driven roller 338. The intermediate transfer belt 334 endlessly moves when the driving roller 336 is driven and rotated by a driving motor, not shown, whereby the intermediate transfer belt 334 moves to the image making units 20B, 20M, 20C, 20Y, in this order.

First, the image making unit 20B transfers a black toner image onto the intermediate transfer belt 334. Subsequently, the image making unit 20M transfers a magenta toner image onto the intermediate transfer belt 334, the image making unit 20C transfers a cyan toner image onto the intermediate transfer belt 334, and the image making unit 20Y transfers a yellow toner image onto the intermediate transfer belt 334, in an overlapping manner. Accordingly, a full-color image is formed on the intermediate transfer belt 334.

Then, a recording sheet P is conveyed from a separation roller pair 16 to the intermediate transfer belt 334 formed with the image, and at a secondary transfer position where the intermediate transfer belt 334 comes into contact with the recording sheet P, the image is transferred from the intermediate transfer belt 334 to the recording sheet P.

At the secondary transfer position, the secondary transfer roller 339 is arranged. The secondary transfer roller 339 presses the recording sheet P onto the intermediate transfer belt 334 at the secondary transfer position. This enhances the transfer efficiency. The secondary transfer roller 339 is in close contact with the intermediate transfer belt 334, and there is no contact/separation mechanism.

Hardware Configuration

Figure 7:
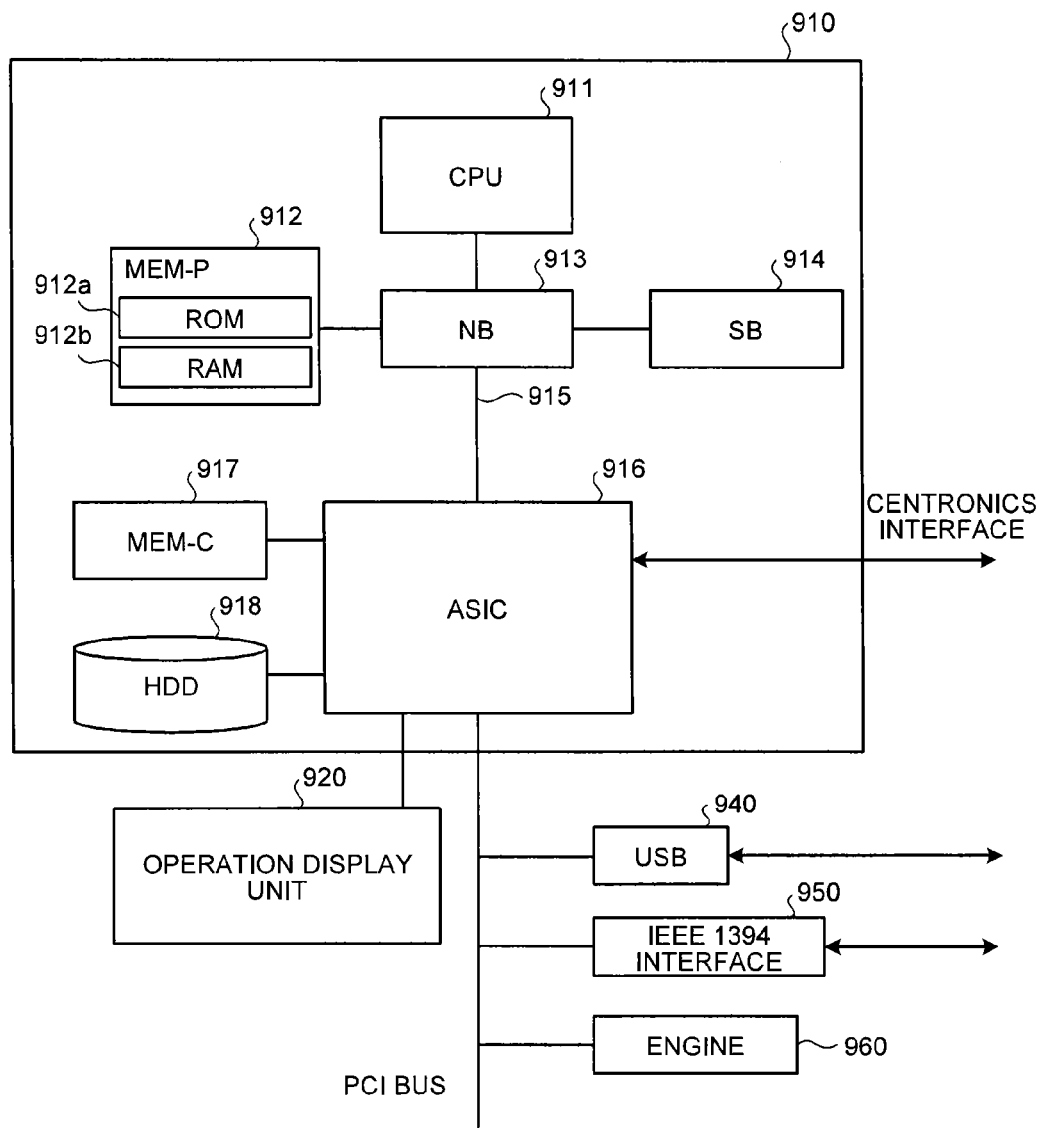
FIG. 7 is a block diagram illustrating an example of hardware configuration of a printing apparatus according to the above embodiment and each modification.

FIG. 7 is a block diagram illustrating an example of hardware configuration of a printing apparatus according to the above embodiment and each modification. As shown in FIG. 7, the printing apparatus of the above embodiment and each modification has such a configuration in which a controller 910 and an engine unit (Engine) 960 are connected via a PCI (Peripheral Component Interconnect) bus. The controller 910 is controller for controlling control, drawing, and communication of the entire multifunction peripheral, and input from an operation display unit 920. The engine unit 960 is a printer engine and the like that can be connected to a PCI bus. For example, it is a black/white plotter, a 1-drum color plotter, a 4-drum color plotter, a scanner, or a facsimile unit. It should be noted that this engine unit 960 includes not only a so-called engine portion such as a plotter but also an image processing portion such as error diffusion and gamma correction.

The controller 910 includes a CPU 911, a north bridge (NB) 913, a system memory (MEM-P) 912, a south bridge (SB) 914, a local memory (MEM-C) 917, an ASIC 916, and a hard disk drive (HDD) 918, and is configured such that the north bridge (NB) 913 and the ASIC 916 are connected by an AGP (Accelerated Graphics Port) bus 915. The MEM-P 912 further includes a ROM 912a and a RAM 912b.

The CPU 911 controls the entire multifunction peripheral, and has a chip set including an NB 913, an MEM-P 912, and an SB 914, and is connected to other devices via this chip set.

The NB 913 is a bridge for connecting the CPU 911 with the MEM-P 912, the SB 914, and the AGP bus 915. The NB 913 includes a memory controller for controlling, e.g., reading/writing to/from the MEM-P 912, a PCI master, and an AGP target.

The MEM-P 912 is a system memory used as, e.g., a memory for storing programs and data, a memory in which programs and data are expanded, and a drawing memory of a printer. The MEM-P 912 includes a ROM 912a and a RAM 912b. The ROM 912a is a read-only memory used as the memory for storing programs and data. The RAM 912b is a writable/readable memory used as, e.g., the memory in which programs and data are expanded and the drawing memory of a printer.

The SB 914 is a bridge for connecting the NB 913 with a PCI device and a peripheral device. This SB 914 is connected to the NB 913 via the PCI bus, and this PCI bus is also connected to a network interface (I/F) unit and the like.

The ASIC 916 is an IC (Integrated Circuit) for image processing having hardware elements for image processing. The ASIC 916 plays a role of a bridge connecting an AGP bus 915, a PCI bus, an HDD 918, and a MEM-C 917. This ASIC 916 includes a PCI target, an AGP master, an arbitor (ARB) which is the main part of the ASIC 916, a memory controller for controlling the MEM-C 917, multiple DMACs (Direct Memory Access Controllers) for, e.g., rotating image data using hardware logic and the like, and a PCI unit for transferring data via the PCI bus to/from the engine unit 960. This ASIC 916 is connected via the PCI bus to a USB (Universal Serial Bus) 940 and an IEEE1394 (the Institute of Electrical and Electronics Engineers 1394) interface 950. The operation display unit 920 is directly connected to the ASIC 916.

The MEM-C 917 is a local memory used for copy image buffer and a code buffer. The HDD 918 is a storage for storing image data, storing programs, storing font data, and storing forms.

The AGP bus 915 is a bus interface for a graphics accelerator card suggested to improve the speed of the graphic processing. By directly accessing the MEM-P 912 with a high throughput, the speed of the graphics accelerator card is improved.

The present embodiments achieve the effect of reducing the adverse influence on the image quality and achieving high quality printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An exposure control apparatus comprising:
   a plurality of line memories;
   a plurality of channels;
   a processing unit that processes image data by successively recording the image data to the plurality of line memories, and successively reading the image data from the plurality of line memories; and
   an exposing unit that performs, with an exposure cycle, an exposure process according to the processed image data, and that forms a latent image based on the image data onto an image carrier,
   wherein each of the plurality of channels transfers each line of the image data with a cycle which is N times greater than the exposure cycle, N being a value that is a natural number,
   wherein the processing unit reads the image data N times with the exposure cycle, and
   wherein the value of N is different in accordance with a transfer origin of each piece of the image data with respect to each channel of the plurality of channels.

2. The exposure control apparatus according to claim 1, wherein the image data is transferred from each of the plurality of channels to the processing unit, and the processing unit performs the processing on each piece of the transferred image data.

3. The exposure control apparatus according to claim 2, further comprising a delay unit that delays a phase of the exposure cycle in units of clocks,
    wherein the processing unit reads the image data with the delayed exposure cycle, and
    wherein the exposing unit performs the exposure process with the delayed exposure cycle.

4. The exposure control apparatus according to claim 3,
    wherein an amount of delay of the exposure cycle is equal to or less than the exposure cycle, and
    wherein the delay unit uses either a counter different from counters for the plurality of channels or the counters for the plurality of channels to delay the exposure cycle by the amount of delay.

5. The exposure control apparatus according to claim 2, wherein black image data is input into channel 0 of the plurality of channels and the value of N for channel 0 is two.

6. The exposure control apparatus according to claim 2, wherein magenta image data is input into channel 1 of the plurality of channels and the value of N for channel 1 is three.

7. The exposure control apparatus according to claim 2, wherein cyan image data is input into channel 2 of the plurality of channels and the value of N for channel 2 is four.

8. The exposure control apparatus according to claim 2, wherein yellow image data is input into channel 3 of the plurality of channels and the value of N for channel 3 is eight.

9. The exposure control apparatus according to claim 2,
    wherein the plurality of channels includes channel 0, channel 1, channel 2, and channel 3,
    wherein black image data is input into channel 0, magenta image data is input into channel 1, cyan image data is input into channel 2, and yellow image data is input into channel 3, and
    wherein a zeroth value of N for channel 0 is less than a first value of N for channel 1, the first value of N for channel 1 is less than a second value of N for channel 2, and the second value of N for channel 2 is less than a third value of N for channel 3.

10. The exposure control apparatus according to claim 1,
    wherein the processing unit reads the image data upon delaying the exposure cycle by an integer multiple, and
    wherein the exposing unit performs the exposure process upon delaying the exposure cycle by an integer multiple.

11. The exposure control apparatus according to claim 1, wherein the processing unit performs skew correction by successively recording the image data to the plurality of line memories and successively reading the image data from the plurality of line memories to correct swell characteristics of the exposing unit.

12. The exposure control apparatus according to claim 1, wherein the processing unit performs skew correction by successively recording the image data to the plurality of line memories and successively reading the image data from the plurality of line memories to correct an inclination of an image based on the image data.

13. The exposure control apparatus according to claim 1, wherein when the value of N is changed, the change of the value of N is not reflected until printing is completed or an exposure of image data in a page being exposed is completed.

14. The exposure control apparatus according to claim 1, wherein the value of N is greater than or equal to two.

15. An image forming apparatus comprising an exposure control apparatus, the exposure control apparatus comprising:
    a plurality of line memories;
    a plurality of channels;
    a processing unit that processes image data by successively recording the image data to the plurality of line memories, and successively reading the image data from the plurality of line memories; and
    an exposing unit that performs, with an exposure cycle, an exposure process according to the processed image data, and that forms a latent image based on the image data onto an image carrier,
    wherein each line of the image data is transferred to the plurality of channels with a cycle which is N times greater than the exposure cycle, N being a value that is a natural number,
    wherein the processing unit reads the image data N times with the exposure cycle, and
    wherein the value of N is different in accordance with a transfer origin of each piece of the image data with respect to each channel of the plurality of channels.

16. An exposure control method comprising:
processing, by a processing unit, image data by successively recording the image data to a plurality of line memories and by successively reading the image data from the plurality of line memories;
performing, by an exposing unit, an exposure process according to the processed image data, with an exposure cycle, and
forming, by the exposing unit, a latent image based on the image data onto an image carrier,
    wherein each line of the image data is transferred to a plurality of channels with a cycle which is N times greater than the exposure cycle, N being a value that is a natural number,
    wherein during the processing, the image data is read N times with the exposure cycle, the value of N being different in accordance with a transfer origin of each piece of the image data with respect to each channel of the plurality of channels.

* * * * *